United States Patent

Gorski

Patent Number: 5,090,988
Date of Patent: Feb. 25, 1992

[54] BOTTOM PLATE FOR H-28 MACHINE

[75] Inventor: Richard A. Gorski, Hartford, Conn.

[73] Assignee: Emhart Glass Machinery (U.S.) Inc., Windsor, Conn.

[21] Appl. No.: 698,610

[22] Filed: May 10, 1991

[51] Int. Cl.$^5$ ............................................. C03B 9/195
[52] U.S. Cl. ......................................... 65/238; 65/242; 65/171; 65/266; 65/241
[58] Field of Search ................. 71/237, 238, 239, 240, 71/242, 266, 171

[56] References Cited

U.S. PATENT DOCUMENTS 1,979,211  1/1933  Rowe ..................................... 65/355
4,339,264  7/1982  Dahms .................................. 65/239

FOREIGN PATENT DOCUMENTS 1203231  8/1989  Japan ..................................... 65/242

Primary Examiner—Richard V. Fisher
Assistant Examiner—John M. Hoffmann
Attorney, Agent, or Firm—Spencer T. Smith

[57] ABSTRACT

A bottom plate for an H-28 machine is secured to a post which is received within a hollow stud and sits on a ball bearing supported within the stud. The post which has an annular groove cooperates with a plurality of locking pins which can be held in operative relation with the post groove or released by a rotatable collar.

3 Claims, 1 Drawing Sheet

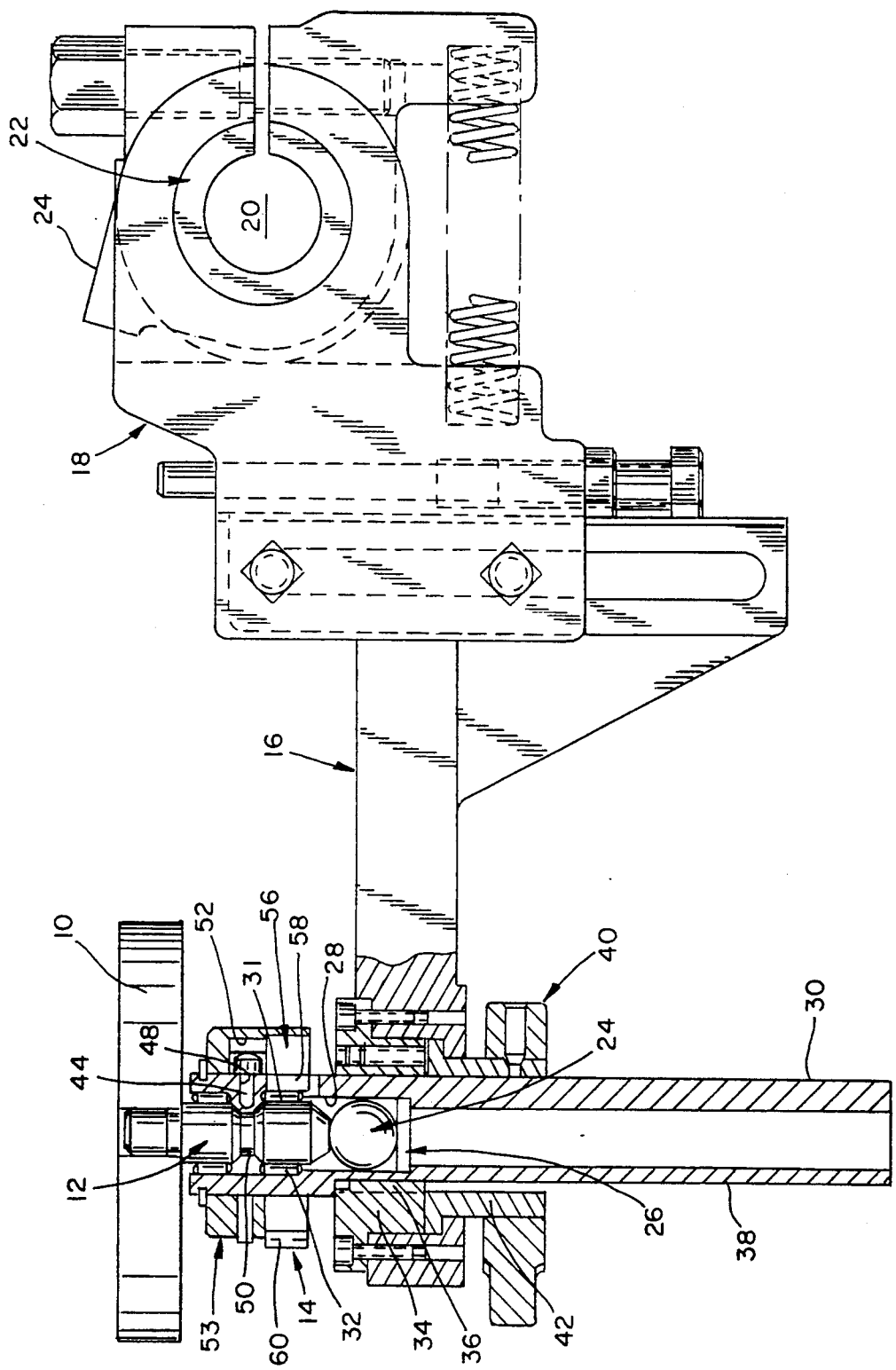

BOTTOM PLATE FOR H-28 MACHINE

Seamless glassware is made on machines known as H-28 machines. Such machines have a plurality of stations which are rotated about a central axis and wherein glassware is formed in each station each 360° cycle of the machine. Such a machine is disclosed in U.S. Pat. No. 1,979,211.

To prevent the formation of seams, the mold which defines each of the stations receives the glass which is rotated in the mold as the glassware is formed. Such a mold has side portions which are displaced towards each other to form the periphery of the mold and a bottom plate which closes the bottom of the mold. In some cases it is desireable to form decoration on the bottom of the glassware. As a result, it is necessary to allow the bottom plate to rotate with the glass.

Glass, being abrasive, wears these components and as a result they must be periodically replaced.

It is accordingly an object of the present invention to provide a quick change rotating bottom plate which will facilitate changing a worn bottom plate.

Other objects and advantages of the present invention will become apparent from the following portion of this specification and from the accompanying drawings which illustrates in accordance with the mandate of the patent statutes a presently preferred embodiment incorporating the principles of the invention.

Referring to the drawing:

The sole FIGURE is a side elevational view in cross-section of a bottom plate assembly for an H-28 machine made in accordance with the teachings of the present invention.

The bottom plate 10 which closes the bottom of the mold includes a downwardly projecting post 12 which is received by a support assembly 14 secured to the arm 16 of a bottom plate assembly the arm 16 is held by a holder 18 which is clamped to a rotatable shaft 20 via a bushing 22 and is rotatable between an up-mold closed position (shown) and a down position (not shown) defined by stop 24.

The bottom plate post 12 rests on a bearing ball 24 which is supported by a horizontal disc 26 located at the bottom of an intermediate size bore 28 in a stud 30. The post 12 includes a pair of annular bearing surfaces 31 which are rotationally located within the axially spaced rings of a bearing 32. The stud 30 is received by a guide 34 which has a key 36 for engaging an axial flat 38 on the stud 30 so that rotation of a hand knob 40 which is secured to an adjusting nut 42 captured between the guide 34 and the bottom plate arm 16 will change the height of the bottom plate 10.

The control pins 44 of three buttons are inserted through holes 48 in the hollow stud to cooperate with a reduced diameter post portion 50 to prevent removal of the bottom plate. The buttons will be held in the lock position by reduced diameter surfaces 52 of a collar 53 except when the collar is rotated to locate the three buttons at three notches in the reduced diameter surface. Lifting the bottom plate will then result in the inclined lower surface of the reduced diameter post portion 50 camming the buttons outwardly freeing the bottom plate for removal. A spiral torsion spring 56 which extends between a cut out 58 in the stud and the lower edge 60 of the guide normally retains the collar at a locking orientation.

I claim:

1. An H-28 machine having a bottom plate assembly comprising
   a post to which a bottom plate is to be secured, said post including a reduced diameter portion having inclined side walls,
   pivotally mounted holder means including an arm,
   post supporting means including
      a hollow stud
      a ball bearing
      means for supporting said ball bearing within said stud for supporting said post with said reduced diameter portion within said stud, and
   coupling means for releaseably coupling said post and said stud including
      a plurality of locking pins extending through a corresponding plurality of hole in said stud and
      collar means for holding said plurality of locking pins against said reduced diameter post portion at a locking orientation and permitting retraction of said locking pins to permit removal of said post from said stud at an unlocking orientation.

2. A bottom plate assembly according to claim 1, further comprising
   means for maintaining said collar means at said locking orientation.

3. A bottom plate assembly according to claim 2, further comprising means for changing the axial position of said stud.

* * * * *